United States Patent
Hong

(10) Patent No.: US 11,431,366 B2
(45) Date of Patent: Aug. 30, 2022

(54) DATA TRANSMISSION METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 209 days.

(21) Appl. No.: 16/760,739

(22) PCT Filed: Nov. 10, 2017

(86) PCT No.: PCT/CN2017/110537
§ 371 (c)(1),
(2) Date: Apr. 30, 2020

(87) PCT Pub. No.: WO2019/090723
PCT Pub. Date: May 16, 2019

(65) Prior Publication Data
US 2020/0350936 A1  Nov. 5, 2020

(51) Int. Cl.
*H04B 1/10* (2006.01)
*H04W 76/27* (2018.01)
(Continued)

(52) U.S. Cl.
CPC ............ *H04B 1/109* (2013.01); *H04W 48/02* (2013.01); *H04W 72/0446* (2013.01); *H04W 72/0453* (2013.01); *H04W 76/27* (2018.02)

(58) Field of Classification Search
CPC ...... H04B 1/109; H04W 76/27; H04W 48/02; H04W 72/0446; H04W 72/0453
See application file for complete search history.

(56) References Cited

U.S. PATENT DOCUMENTS 9,462,593 B2  10/2016  Tujkovic et al.
2013/0294398 A1  11/2013  Tujkovic et al.
(Continued)

FOREIGN PATENT DOCUMENTS

CN  106304403 A  1/2017
CN  106330419 A  1/2017
(Continued)

OTHER PUBLICATIONS

International Search Report in the international application No. PCT/CN2017/110537, dated Aug. 1, 2018.
(Continued)

*Primary Examiner* — Brenda H Pham
(74) *Attorney, Agent, or Firm* — Syncoda LLC; Feng Ma

(57) ABSTRACT

A data transmission method is applied to a primary base station and includes: when configuring a secondary base station for a terminal, configuring, for the secondary base station, carrier parameters for use by the secondary base station; configuring, for the terminal, an autonomous denial rule used when cross-modulation interference occurs between carriers for use by the secondary base station and a carrier used by the primary base station; sending the carrier parameters and the autonomous denial rule to the terminal so that the terminal determines a carrier used by the secondary base station according to the carrier parameters, determines autonomously denied carriers according to the autonomous denial rule when cross-modulation interference occurs between the carrier used by the secondary base station and the carrier used by the primary base station, and performs data transmission by using carriers other than the autonomously denied carriers.

19 Claims, 17 Drawing Sheets

---

| In configuring a secondary base station for a terminal, a carrier parameter used by the secondary base station is configured for the secondary base station | — 110 |

↓

| An autonomous rejection rule for an inter-modulation distortion occurred between a carrier used by the secondary base station and a carrier used by a primary base station is configured for the terminal | — 120 |

↓

| The carrier parameter and autonomous rejection rule configured by the primary base station are sent to the terminal | — 130 |

(51) Int. Cl.
*H04W 48/02* (2009.01)
*H04W 72/04* (2009.01)

(56) References Cited

U.S. PATENT DOCUMENTS

| | | | | |
|---|---|---|---|---|
| 2014/0126552 A1* | 5/2014 | Dayal | ................... | H04W 88/06 370/336 |
| 2015/0319643 A1* | 11/2015 | Zhu | .......................... | H04B 1/04 370/336 |
| 2016/0302209 A1* | 10/2016 | Behravan | .............. | H04L 1/0003 |
| 2017/0302419 A1 | 10/2017 | Liu et al. | | |
| 2019/0044678 A1 | 2/2019 | Liu et al. | | |
| 2020/0322108 A1 | 10/2020 | Liu et al. | | |

FOREIGN PATENT DOCUMENTS

| | | |
|---|---|---|
| CN | 107148085 A | 9/2017 |
| EP | 2661002 A1 | 11/2013 |

OTHER PUBLICATIONS

English translation of the Written Opinion of the International Search Authority in the international application No. PCT/CN2017/110537, dated Aug. 1, 2018.
Etsi et al.: "LTE; Evolved Universal Terrestrial Radio Access (E-UTRA); Radio Resource Control (RRC); Protocol specification (3GPP TS 36.331 version 13.2.0 Release 13)", ETSI TS 136 331 V13.2.0, Jul. 11, 2016 (Jul. 11, 2016), pp. 1-834, XP055565422.
"LTE; Evolved Universal Terrestrial Radio Access (E-UTRA) and Evolved Universal Terrestrial Radio Access Network (E-UTRAN); Overall description; Stage 2 (3GPP TS 36.300 version 11.14.0 Release 11)", Technical Specification, European Telecommunications Standards Institute (ETSI), 650, Route Des Lucioles; F-06921 Sophia-Antipolis; France, vol. 3GPP RAN 2, No. V11.14.0, Jan. 1, 2016 (Jan. 1, 2016), XP014266408.
Supplementary European Search Report in the European application No. 17931557.7, dated Jun. 9, 2021.

* cited by examiner

DATA TRANSMISSION METHOD AND DEVICE

CROSS-REFERENCE TO RELATED APPLICATION

This application is a national stage of International Application No. PCT/CN2017/110537 filed on Nov. 10, 2017, the disclosure of which is hereby incorporated by reference in its entirety.

TECHNICAL FIELD

The present disclosure generally relates to the technical field of communication technologies, and more particularly, to a data transmission method and device.

BACKGROUND

Along with constant development of communication technologies, intelligent terminals have been used extensively. In a new-generation communication system, a new application scenario is provided, i.e., an Evolved Universal Mobile Telecommunications System (UMTS) Terrestrial Radio Access Network (EUTRAN) New Radio (NR)-Dual Connectivity (EN-DC) (dual connectivity of an LTE network and an NR network) scenario, the LTE network being a 4th-Generation (4G) network and the NR network being a 5th-Generation (5G) network. In this scenario, a terminal is required to keep two communication links at the same time: one is an LTE communication link and the other is an NR communication link. However, in a related art, if a terminal simultaneously performs uplink transmission in two bands, there may be serious inter-modulation distortion in downlink reception in a certain band, resulting in reduction of performance of the terminal.

SUMMARY

For solving the problem in the related art, embodiments of the present disclosure provide a data transmission method and device.

According to a first aspect of the embodiments of the present disclosure, a data transmission method is provided, which is applied to a primary base station and includes the following operations.

In configuring a secondary base station for a terminal, a carrier parameter used by the secondary base station is configured for the secondary base station.

An autonomous rejection rule for an inter-modulation distortion occurred between a carrier used by the secondary base station and a carrier used by the primary base station is configured for the terminal.

The carrier parameter and the autonomous rejection rule are sent to the terminal.

In an embodiment, the primary base station may be an LTE base station, and the secondary base station may be an NR base station.

In an embodiment, the autonomous rejection rule may include a specified number and a specified number of times.

The specified number may be configured for representing the number of consecutive subframes in a carrier.

The specified number of times may be configured for representing the number of times that uplink subframe transmission is allowed to be autonomously rejected in the specified number of consecutive subframes.

In an embodiment, the autonomous rejection rule may further include a specified carrier.

The specified carrier may be configured for representing a carrier allowed to be autonomously rejected in carriers configured for the secondary base station by the primary base station.

In an embodiment, the operation that the carrier parameter and the autonomous rejection rule are sent to the terminal may include the following actions.

The carrier parameter and the autonomous rejection rule are added into Radio Resource Control (RRC) connection configuration signaling.

The RRC connection configuration signaling containing the carrier parameter and the autonomous rejection rule is sent to the terminal, to enable the terminal to acquire the carrier parameter and the autonomous rejection rule from the RRC connection configuration signaling.

According to a second aspect of the embodiments of the present disclosure, a data transmission method is provided, which is applied to a terminal and includes the following operations.

A carrier parameter and autonomous rejection rule sent by a primary base station are received, the carrier parameter being a carrier parameter configured for a secondary base station by the primary base station and used by the secondary base station, and the autonomous rejection rule being an autonomous rejection rule configured for the terminal by the primary base station for the terminal to address an inter-modulation distortion.

A carrier used by the secondary base station is determined according to the carrier parameter.

In response to an inter-modulation distortion occurring between the carrier used by the secondary base station and a carrier used by the primary base station, an autonomously rejected carrier is determined according to the autonomous rejection rule, and data transmission is performed with another carrier except the autonomously rejected carrier.

In an embodiment, the primary base station may be an LTE base station, and the secondary base station may be an NR base station.

In an embodiment, the operation that the carrier parameter and autonomous rejection rule sent by the primary base station are received may include the following actions.

RRC connection configuration signaling sent by the primary base station is received, the RRC connection configuration signaling containing the carrier parameter and the autonomous rejection rule.

The carrier parameter and the autonomous rejection rule are acquired from the RRC connection configuration signaling.

In an embodiment, the autonomous rejection rule may include a specified number and a specified number of times, the specified number may be configured for representing the number of consecutive subframes in a carrier, and the specified number of times may be configured for representing the number of times that uplink subframe transmission is allowed to be autonomously rejected in the specified number of consecutive subframes.

The operation that the autonomously rejected carrier is determined according to the autonomous rejection rule may include the following action.

The carrier meeting the autonomous rejection rule in the carrier used by the secondary base station and the carrier used by the primary base station is determined as the autonomously rejected carrier.

In an embodiment, the operation that the carrier meeting the autonomous rejection rule in the carrier used by the secondary base station and the carrier used by the primary base station is determined as the autonomously rejected carrier may include the following action.

In response to both the carrier used by the secondary base station and the carrier used by the primary base station meeting the autonomous rejection rule, the autonomously rejected carrier is determined according to a transmission carrier required by data to be transmitted, the autonomously rejected carrier being different from the transmission carrier required by the data to be transmitted.

In an embodiment, the autonomous rejection rule may further include a specified carrier, and the specified carrier may be configured for representing a carrier allowed to be autonomously rejected in carriers configured for the secondary base station by the primary base station.

The operation that the autonomously rejected carrier is determined according to the autonomous rejection rule may include the following action.

The specified carrier is determined as the autonomously rejected carrier.

According to a third aspect of the embodiments of the present disclosure, a data transmission device is provided, which is applied to a primary base station and includes a first configuration module, a second configuration module and a sending module.

The first configuration module is configured to, in configuring a secondary base station for a terminal, configure a carrier parameter used by the secondary base station for the secondary base station.

The second configuration module is configured to configure an autonomous rejection rule for an inter-modulation distortion occurred between a carrier used by the secondary base station and a carrier used by the primary base station for the terminal.

The sending module is configured to send the carrier parameter and the autonomous rejection rule to the terminal.

In an embodiment, the primary base station may be an LTE base station, and the secondary base station may be an NR base station.

In an embodiment, the autonomous rejection rule may include a specified number and a specified number of times.

The specified number may be configured for representing the number of consecutive subframes in a carrier.

The specified number of times may be configured for representing the number of times that uplink subframe transmission is allowed to be autonomously rejected in the specified number of consecutive subframes.

In an embodiment, the autonomous rejection rule may further include a specified carrier.

The specified carrier may be configured for representing a carrier allowed to be autonomously rejected in carriers configured for the secondary base station by the primary base station.

In an embodiment, the sending module may include an addition submodule and a sending submodule.

The addition submodule is configured to add the carrier parameter and the autonomous rejection rule into RRC connection configuration signaling.

The sending submodule is configured to send the RRC connection configuration signaling containing the carrier parameter and the autonomous rejection rule to the terminal, to enable the terminal to acquire the carrier parameter and the autonomous rejection rule from the RRC connection configuration signaling.

According to a fourth aspect of the embodiments of the present disclosure, a data transmission device is provided, which is applied to a terminal and includes a receiving module, a determination module and a data transmission module.

The receiving module is configured to receive a carrier parameter and autonomous rejection rule sent by a primary base station, the carrier parameter being a carrier parameter configured for a secondary base station by the primary base station and used by the secondary base station, and the autonomous rejection rule being an autonomous rejection rule configured for the terminal by the primary base station for the terminal to address an inter-modulation distortion.

The determination module is configured to determine a carrier used by the secondary base station according to the carrier parameter.

The data transmission module is configured to, in response to an inter-modulation distortion occurring between the carrier used by the secondary base station and a carrier used by the primary base station, determine an autonomously rejected carrier according to the autonomous rejection rule and perform data transmission with another carrier except the autonomously rejected carrier.

In an embodiment, the primary base station may be an LTE base station, and the secondary base station may be an NR base station.

In an embodiment, the receiving module may include a receiving submodule and an acquisition submodule.

The receiving submodule is configured to receive RRC connection configuration signaling sent by the primary base station, the RRC connection configuration signaling containing the carrier parameter and the autonomous rejection rule.

The acquisition submodule is configured to acquire the carrier parameter and the autonomous rejection rule from the RRC connection configuration signaling.

In an embodiment, the autonomous rejection rule may include a specified number and a specified number of times, the specified number may be configured for representing the number of consecutive subframes in a carrier, and the specified number of times may be configured for representing the number of times that uplink subframe transmission is allowed to be autonomously rejected in the specified number of consecutive subframes.

The data transmission module may include a first determination submodule and a first transmission submodule.

The first determination submodule is configured to, in response to an inter-modulation distortion occurring between the carrier used by the secondary base station and the carrier used by the primary base station, determine, in the carrier used by the secondary base station and the carrier used by the primary base station, the carrier meeting the autonomous rejection rule as the autonomously rejected carrier.

The first transmission submodule is configured to perform data transmission with the other carrier except the autonomously rejected carrier.

In an embodiment, the first determination submodule may include a second determination submodule.

The second determination submodule is configured to, in response to both the carrier used by the secondary base station and the carrier used by the primary base station meeting the autonomous rejection rule, determine the autonomously rejected carrier according to a transmission carrier required by data to be transmitted, the autonomously rejected carrier being different from the transmission carrier required by the data to be transmitted.

In an embodiment, the autonomous rejection rule may further include a specified carrier, and the specified carrier may be configured for representing a carrier allowed to be autonomously rejected in carriers configured for the secondary base station by the primary base station.

The data transmission module may include a third determination submodule and a second transmission submodule.

The third determination submodule is configured to determine the specified carrier as the autonomously rejected carrier.

The second transmission submodule is configured to perform data transmission with the other carrier except the autonomously rejected carrier.

According to a fifth aspect of the embodiments of the present disclosure, a non-transitory computer-readable storage medium is provided, the storage medium having stored therein a computer program for executing the data transmission method of the first aspect.

According to a sixth aspect of the embodiments of the present disclosure, a non-transitory computer-readable storage medium is provided, the storage medium having stored therein a computer program for executing the data transmission method of the second aspect.

According to a seventh aspect of the embodiments of the present disclosure, a data transmission device is provided, which is applied to a primary base station and includes:

a processor; and a memory device for storing instructions executable by the processor, wherein the processor is configured to:

in configuring a secondary base station for a terminal, configure a carrier parameter used by the secondary base station for the secondary base station;

configure an autonomous rejection rule for an inter-modulation distortion occurred between a carrier used by the secondary base station and a carrier used by the primary base station for the terminal; and send the carrier parameter and the autonomous rejection rule to the terminal.

According to an eighth aspect of the embodiments of the present disclosure, a data transmission device is provided, which is applied to a terminal and includes:

a processor; and a memory device for storing instructions executable by the processor, wherein the processor is configured to:

receive a carrier parameter and autonomous rejection rule sent by a primary base station, the carrier parameter being a carrier parameter configured for a secondary base station by the primary base station and used by the secondary base station, and the autonomous rejection rule being an autonomous rejection rule configured for the terminal by the primary base station for the terminal to address an inter-modulation distortion;

determine a carrier used by the secondary base station according to the carrier parameter; and in response to an inter-modulation distortion occurring between the carrier used by the secondary base station and a carrier used by the primary base station, determine an autonomously rejected carrier according to the autonomous rejection rule and perform data transmission with another carrier except the autonomously rejected carrier.

The technical solutions provided in the embodiments of the present disclosure may have the following beneficial effects:

In the present disclosure, the primary base station, when configuring the secondary base station for the terminal, may configure the carrier parameter used by the secondary base station for the secondary base station, configure the autonomous rejection rule for the inter-modulation distortion occurred between the carrier used by the secondary base station and the carrier used by the primary base station for the terminal and send the carrier parameter and autonomous rejection rule configured by the primary base station to the terminal. Therefore, the terminal may determine the carrier used by the secondary base station according to the carrier parameter configured by the primary base station and, in response to the inter-modulation distortion occurring between the carrier used by the secondary base station and the carrier used by the primary base station, determine the autonomously rejected carrier according to the autonomous rejection rule configured by the primary base station and perform data transmission with the other carrier except the determined autonomously rejected carrier, so that important downlink signaling reception or important uplink signaling transmission of the terminal is ensured, and communication quality is improved.

In the present disclosure, the terminal may receive the carrier parameter and autonomous rejection rule sent by the primary base station, determine the carrier used by the secondary base station according to the carrier parameter configured by the primary base station and, when the inter-modulation distortion occurs between the carrier used by the secondary base station and the carrier used by the primary base station, determine the autonomously rejected carrier according to the autonomous rejection rule configured by the primary base station and perform data transmission with the other carrier except the determined autonomously rejected carrier, so that important downlink signaling reception or important uplink signaling transmission of the terminal is ensured, and the communication quality is improved.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A/an," "said" and "the" in a singular form in the present disclosure and the appended claims are also intended to include a plural form, unless other meanings are clearly denoted throughout the present disclosure. It is also to be understood that term "and/or" used herein refers to and includes any or all possible combinations of one or more associated items that are listed.

It is to be understood that, although terms first, second, third and the like may be adopted to describe various information in the present disclosure, the information should not be limited by these terms. These terms are only adopted to distinguish the information of the same type. For example, without departing from the scope of the present disclosure, first information may also be called second information and, similarly, second information may also be called first information. For example, term "if" used herein may be explained as "while" or "when" or "responsive to determining," which depends on the context.

Figure 1:
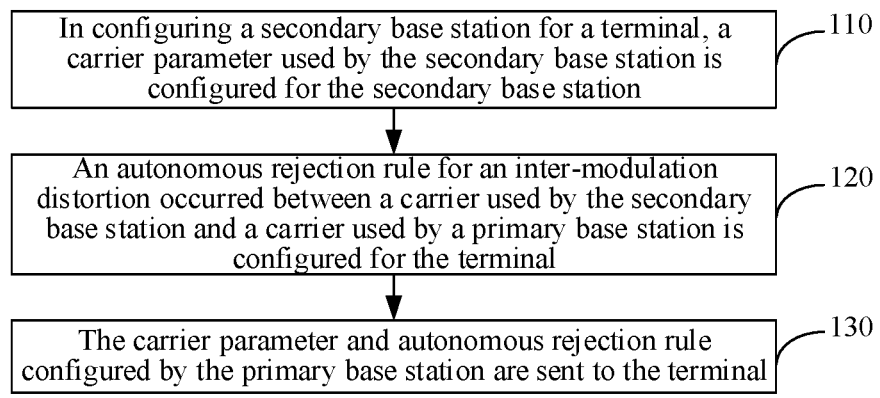
FIG. 1 is a flowchart showing a data transmission method, according to an exemplary embodiment.
Figure 2:
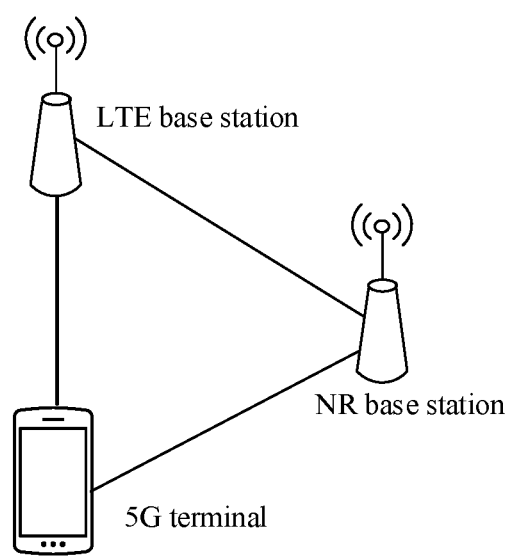
FIG. 2 is a scenario diagram of a data transmission method, according to an exemplary embodiment.

FIG. 1 is a flowchart showing a data transmission method, according to an exemplary embodiment. FIG. 2 is a scenario diagram of a data transmission method, according to an exemplary embodiment. The data transmission method may be applied to a primary base station, for example, an LTE base station. As shown in FIG. 1, the data transmission method includes the following operations 110-130.

At block 110, in configuring a secondary base station for a terminal, a carrier parameter used by the secondary base station is configured for the secondary base station.

In the embodiment of the present disclosure, the terminal may establish connections with both the primary base station and the secondary base station, and may not only be served by the primary base station but also be served by the secondary base station. For example, the network service provided by the primary base station is service provided by a 4G network, and the network service provided by the secondary base station is service provided by a 5G network.

The primary base station, when configuring the secondary base station for the terminal, may configure the carrier parameter used by the secondary base station for the secondary base station for a purpose of enabling the terminal to learn a carrier used by the secondary base station according to the carrier parameter and perform data transmission with the carrier. The carrier parameter configured by the primary base station may include, but not limited to, a carrier frequency, a configuration parameter for each protocol layer and the like.

At block 120, an autonomous rejection rule for an inter-modulation distortion occurred between a carrier used by the secondary base station and a carrier used by the primary base station is configured for the terminal.

In the embodiment of the present disclosure, the primary base station, when configuring the carrier parameter for the secondary base station, may also indicate the autonomous rejection rule for the configured carrier in case of the inter-modulation distortion to the terminal.

At block 130, the carrier parameter and autonomous rejection rule configured by the primary base station are sent to the terminal.

In the embodiment of the present disclosure, after the carrier parameter and autonomous rejection rule configured by the primary base station are sent to the terminal, the terminal may determine the carrier used by the secondary base station according to the carrier parameter configured by the primary base station and, when the inter-modulation distortion occurs between the carrier used by the secondary base station and the carrier used by the primary base station, determine the autonomously rejected carrier according to the autonomous rejection rule configured by the primary base station and perform data transmission with the other carrier except the determined autonomously rejected carrier.

In an embodiment, the primary base station is an LTE base station, and the secondary base station is an NR base station. As shown in FIG. 2, a scenario of the embodiment includes a 5G terminal, an LTE base station and an NR base station, and the 5G terminal is connected with the LTE base station and the NR base station respectively. The LTE base station, when configuring the NR base station for the 5G terminal as a secondary base station and configuring a carrier parameter used by the NR base station, may also indicate an autonomous rejection rule for a configured carrier in case of an inter-modulation distortion to the 5G terminal. As such, the 5G terminal may determine a carrier used by the NR base station according to the carrier parameter configured for the NR base station by the LTE base station. When the inter-modulation distortion occurs between the carrier used by the NR base station and a carrier used by the LTE base station, the 5G terminal may determine an autonomously rejected carrier according to the autonomous rejection rule configured for the 5G terminal by the LTE base station and perform data transmission with another carrier except the determined autonomously rejected carrier.

It can be seen from the embodiment that, when the secondary base station is configured for the terminal, the carrier parameter used by the secondary base station is configured for the secondary base station, the autonomous rejection rule for the inter-modulation distortion occurred between the carrier used by the secondary base station and the carrier used by the primary base station is configured for the terminal, and the carrier parameter and autonomous rejection rule configured by the primary base station are sent to the terminal. As such, the terminal may determine the carrier used by the secondary base station according to the carrier parameter configured by the primary base station and, when the inter-modulation distortion occurs between the carrier used by the secondary base station and the carrier used by the primary base station, determine the autonomously rejected carrier according to the autonomous rejection rule configured by the primary base station and perform data transmission with the other carrier except the determined autonomously rejected carrier, so that important downlink signaling reception or important uplink signaling transmission by the terminal is ensured, and communication quality is improved.

In an embodiment, the autonomous rejection rule configured for the terminal by the primary base station at block 120 may include a specified number and a specified number of times. The specified number is configured for representing the number of consecutive subframes in a carrier, and the specified number of times is configured for representing the number of times that uplink subframe transmission is allowed to be autonomously rejected in the specified number of consecutive subframes.

The specified number may refer to a specified number of subframes, and the specified number of times may be the specified number of rejections.

It can be seen from the embodiment that the specified number and the specified number of times are configured for the terminal, the specified number being configured for representing the number of the consecutive subframes in a carrier and the specified number of times being configured for representing the number of times that uplink subframe transmission is allowed to be autonomously rejected in the specified number of consecutive subframes. The terminal may determine a carrier meeting the specified number and the specified number of times as the autonomously rejected carrier and perform data transmission with the other carrier except the autonomously rejected carrier, so that the inter-modulation distortion is avoided, and reliability of the data transmission is improved.

In an embodiment, the autonomous rejection rule configured for the terminal by the primary base station at block 120 may include the specified number and the specified number of times, and may further include a specified carrier.

The specified number is configured for representing the number of the consecutive subframes in a carrier. The specified number of times is configured for representing the number of times that uplink subframe transmission is allowed to be autonomously rejected in the specified number of consecutive subframes. The specified carrier is configured for representing a carrier allowed to be autonomously rejected in carriers configured for the secondary base station by the primary base station.

It can be seen from the embodiment that the specified carrier is configured for the terminal, and the specified carrier represents the carrier allowed to be autonomously rejected in the carriers configured for the secondary base station by the primary base station. The terminal may directly determine the specified carrier as the autonomously rejected carrier and perform data transmission with the other carrier except the autonomously rejected carrier, so that efficiency in determining the autonomously rejected carrier by the terminal is improved, the inter-modulation distortion is also avoided, and the reliability of the data transmission is improved.

Figure 3:
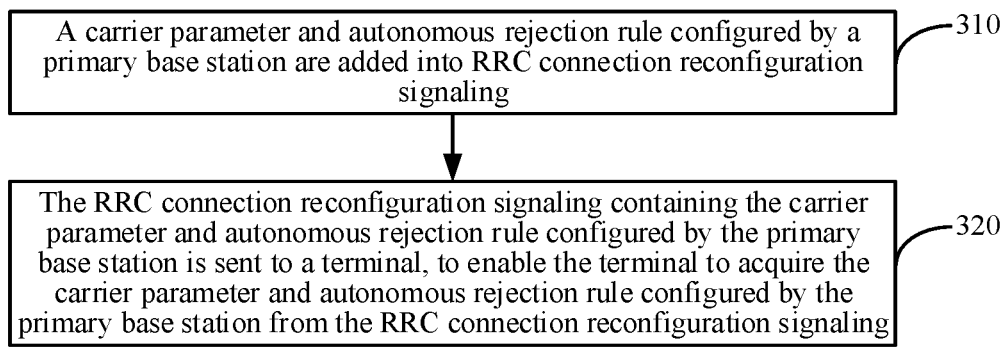
FIG. 3 is a flowchart showing another data transmission method, according to an exemplary embodiment.

In an embodiment, at block 130, the carrier parameter and autonomous rejection rule configured by the primary base station may be sent to the terminal in, but not limited to, the following manner, namely through blocks 310-320, as shown in FIG. 3.

At block 310, the carrier parameter and autonomous rejection rule configured by the primary base station are added into RRC connection configuration (RRCConnectionReconfiguration) signaling.

For example, it is configured in NR secondary cell group configuration (NR-secondaryCellGroupConfig) signaling that the terminal may automatically reject uplink subframe transmission for M times in N consecutive subframes on a certain configured carrier and/or implement automatic rejection on a G carrier. The NR secondary cell group configuration signaling is included in the RRC connection configuration signaling, and is applied to NR secondary carrier configuration of the terminal to enable the terminal to perform data transmission with NR.

At block 320, the RRC connection configuration signaling containing the carrier parameter and autonomous rejection rule configured by the primary base station is sent to the terminal, such that the terminal acquires the carrier parameter and autonomous rejection rule configured by the primary base station from the RRC connection configuration signaling.

It can be seen from the embodiment that the carrier parameter and autonomous rejection rule configured by the primary base station are added into the RRC connection configuration signaling and the RRC connection configuration signaling containing the carrier parameter and autonomous rejection rule configured by the primary base station is sent to the terminal, to enable the terminal to accurately and rapidly acquire the carrier parameter and autonomous rejection rule configured by the primary base station from the RRC connection configuration signaling, so that efficiency of acquiring configuration information of the primary base station by the terminal is improved.

Figure 4:
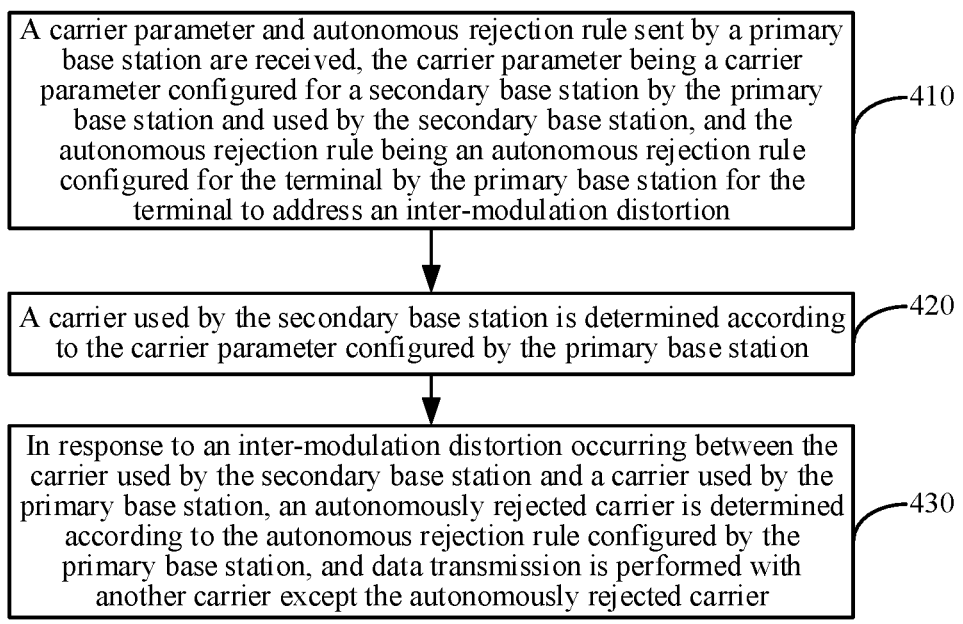
FIG. 4 is a flowchart showing a data transmission method, according to an exemplary embodiment.

FIG. 4 is a flowchart showing a data transmission method, according to an exemplary embodiment. The data transmission method may be applied to a terminal, for example, a 5G terminal. As shown in FIG. 4, the data transmission method includes the following operations 410-430.

At block 410, a carrier parameter and autonomous rejection rule sent by a primary base station are received. The carrier parameter is a carrier parameter configured for a secondary base station by the primary base station and used by the secondary base station, and the autonomous rejection rule is an autonomous rejection rule configured for the terminal by the primary base station for the terminal to address an inter-modulation distortion.

At block 420, a carrier used by the secondary base station is determined according to the carrier parameter configured by the primary base station.

At block 430, in response to an inter-modulation distortion occurring between the carrier used by the secondary base station and a carrier used by the primary base station, an autonomously rejected carrier is determined according to the autonomous rejection rule configured by the primary base station, and data transmission is performed with another carrier except the autonomously rejected carrier.

In the embodiment of the present disclosure, the terminal, after receiving the autonomous rejection rule configured by the primary base station and when being required to receive important downlink signaling or required to send important uplink signaling, may autonomously determine uplink transmission in a certain carrier to be suspended according to the autonomous rejection rule to avoid inter-modulation distortion in downlink reception in another carrier.

In an embodiment, the primary base station may be an LTE base station, and the secondary base station may be an NR base station, as shown in the embodiment scenario in FIG. 2.

For example, the terminal is required to receive downlink signaling in an LTE carrier, and if uplink transmission is performed in an NR carrier and the LTE carrier at the same time, there may be inter-modulation distortion to reception of the downlink signaling in the LTE carrier. In such case, the terminal may autonomously reject uplink transmission in the NR carrier.

For another example, the terminal is required to send a Hybrid Automatic Repeat-reQuest (HARQ) feedback for an NR downlink carrier in an NR uplink carrier, and in such case, the terminal may autonomously reject uplink transmission in an LTE carrier. Since inter-modulation distortion may be generated when the terminal simultaneously performs uplink transmission in an NR carrier and an LTE carrier, the terminal needs to reject a certain carrier to prevent the inter-modulation distortion. However, since an important HARQ feedback is to be sent by uplink transmission of NR, the terminal selects to reject uplink transmission in the LTE carrier, thereby ensuring uplink transmission of the terminal in the NR carrier and also avoiding the inter-modulation distortion.

It can be seen from the embodiment that the carrier parameter and autonomous rejection rule sent by the primary base station are received, the carrier used by the secondary base station is determined according to the carrier parameter configured by the primary base station, and when the inter-modulation distortion occurs between the carrier used by the secondary base station and the carrier used by the primary base station, the autonomously rejected carrier is determined according to the autonomous rejection rule configured by the primary base station and data transmission is performed with the other carrier except the determined autonomously rejected carrier. Therefore, important downlink signaling reception or important uplink signaling transmission of the terminal is ensured, and communication quality is improved.

Figure 5:
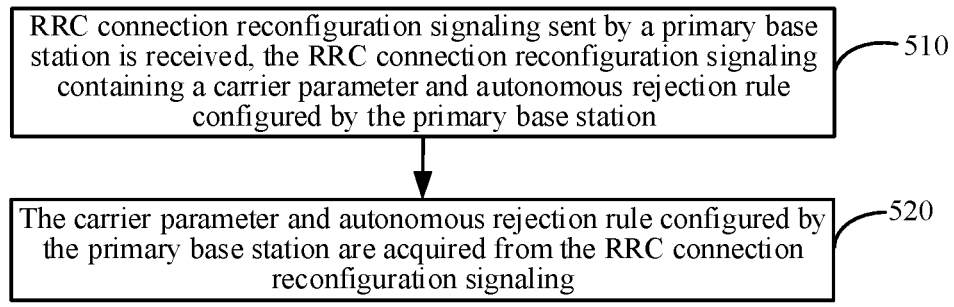
FIG. 5 is a flowchart showing another data transmission method, according to an exemplary embodiment.

In an embodiment, at block 410, the carrier parameter and autonomous rejection rule sent by the primary base station may be received in, but not limited to, the following manner, namely through blocks 510-520, as shown in FIG. 5.

At block 510, RRC connection configuration signaling sent by the primary base station is received. The RRC connection configuration signaling includes the carrier parameter and autonomous rejection rule configured by the primary base station.

At block 520, the carrier parameter and autonomous rejection rule configured by the primary base station are acquired from the RRC connection configuration signaling.

It can be seen from the embodiment that the RRC connection configuration signaling sent by the primary base station is received and the carrier parameter and autonomous rejection rule configured by the primary base station are acquired from the RRC connection configuration signaling, so that efficiency of acquiring configuration information of the primary base station by the terminal is improved.

Figure 6:
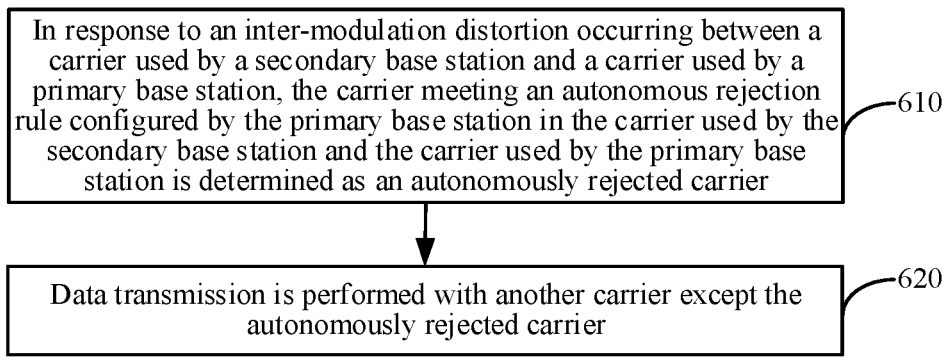
FIG. 6 is a flowchart showing another data transmission method, according to an exemplary embodiment.

In an embodiment, at block 410, the autonomous rejection rule configured for the terminal by the primary base station may include a specified number and a specified number of times. The specified number is configured for representing the number of consecutive subframes in a carrier, and the specified number of times is configured for representing the number of times that uplink subframe transmission is allowed to be autonomously rejected in the specified number of consecutive subframes. As shown in FIG. 6, the block 430 may be implemented in, but not limited to, the following manner, namely through blocks 610-620.

At block 610, in response to an inter-modulation distortion occurring between the carrier used by the secondary base station and the carrier used by the primary base station, the carrier meeting the autonomous rejection rule configured by the primary base station in the carrier used by the secondary base station and the carrier used by the primary base station is determined as the autonomously rejected carrier.

At block 620, data transmission is performed with the other carrier except the autonomously rejected carrier.

It can be seen from the embodiment that the carrier meeting the autonomous rejection rule configured by the primary base station is determined as the autonomously rejected carrier and data transmission is performed with the other carrier except the autonomously rejected carrier, so that the inter-modulation distortion is avoided, and reliability of data transmission is improved.

Figure 7:
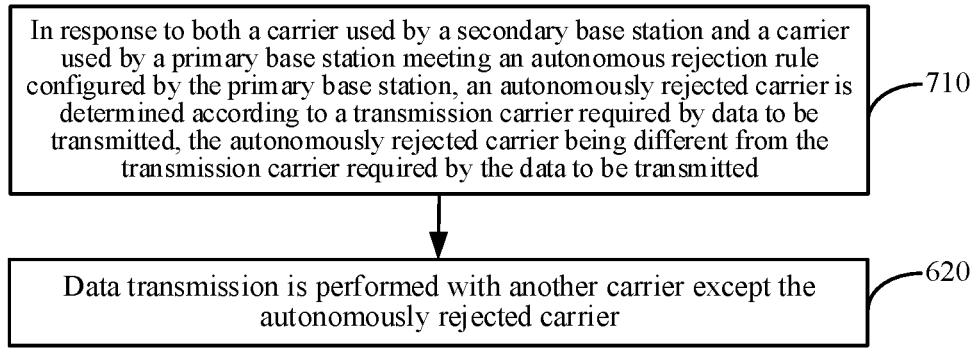
FIG. 7 is a flowchart showing another data transmission method, according to an exemplary embodiment.

In an embodiment, at block 610, the operation that the carrier meeting the autonomous rejection rule in the carrier used by the secondary base station and the carrier used by the primary base station is determined as the autonomously rejected carrier may be implemented in, but not limited to the following manner, namely through block 710, as shown in FIG. 7.

At block 710, in response to both the carrier used by the secondary base station and the carrier used by the primary base station meeting the autonomous rejection rule configured by the primary base station, the autonomously rejected carrier is determined according to a transmission carrier required by data to be transmitted, the autonomously rejected carrier being different from the transmission carrier required by the data to be transmitted.

It can be seen from the embodiment that the autonomously rejected carrier is determined according to the transmission carrier required by the data to be transmitted, and the autonomously rejected carrier is different from the transmission carrier required by the data to be transmitted, so that autonomous rejection manners for the terminal are enriched, and an applicability of data transmission is improved.

Figure 8:
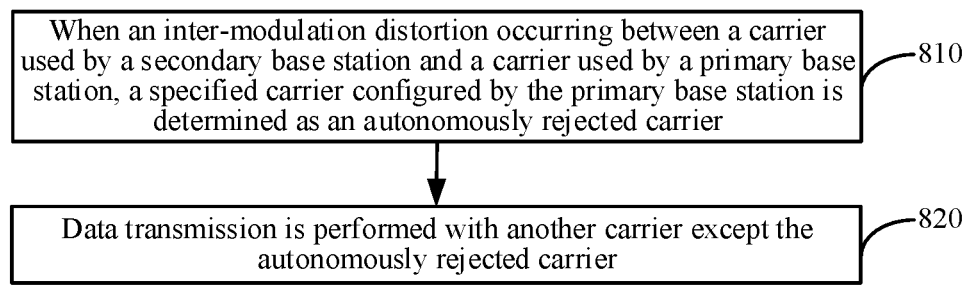
FIG. 8 is a flowchart showing another data transmission method, according to an exemplary embodiment.

In an embodiment, at block 410, the autonomous rejection rule configured for the terminal by the primary base station may include the specified number and the specified number of times, and may further include a specified carrier. The specified number is configured for representing the number of the consecutive subframes in a carrier. The specified number of times is configured for representing the number of times that uplink subframe transmission is allowed to be autonomously rejected in the specified number of consecutive subframes, and the specified carrier is configured for representing a carrier allowed to be autonomously rejected in carriers configured for the secondary base station by the primary base station. As shown in FIG. 8, the block 430 may be implemented in, but not limited to, the following manner, namely through blocks 810-820.

At block 810, in response to an inter-modulation distortion occurring between the carrier used by the secondary base station and the carrier used by the primary base station, the specified carrier configured by the primary base station is determined as the autonomously rejected carrier.

At block 820, data transmission is performed with the other carrier except the autonomously rejected carrier.

It can be seen from the embodiment that the specified carrier configured by the primary base station is directly determined as the autonomously rejected carrier and data transmission is performed with the other carrier except the autonomously rejected carrier, so that efficiency in determining the autonomously rejected carrier by the terminal is improved, the inter-modulation distortion is also avoided, and reliability of the data transmission is improved.

Corresponding to the embodiments of the data transmission method, the present disclosure also provides embodiments of a data transmission device.

Figure 9:
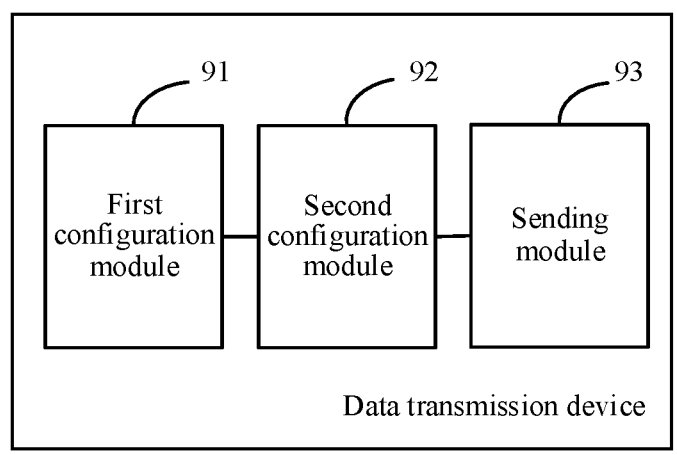
FIG. 9 is a block diagram of a data transmission device, according to an exemplary embodiment.

FIG. 9 is a block diagram of a data transmission device, according to an exemplary embodiment. The device is applied to a primary base station, and is configured to execute the data transmission method shown in FIG. 1. As shown in FIG. 9, the data transmission device may include a first configuration module 91, a second configuration module 92 and a sending module 93.

The first configuration module 91 is configured to, in configuring a secondary base station for a terminal, configure a carrier parameter used by the secondary base station for the secondary base station.

The second configuration module 92 is configured to configure an autonomous rejection rule for an inter-modulation distortion occurred between a carrier used by the secondary base station and a carrier used by the primary base station for the terminal.

The sending module 93 is configured to send the carrier parameter and the autonomous rejection rule to the terminal.

In an embodiment, the primary base station is an LTE base station, and the secondary base station is an NR base station.

It can be seen from the embodiment that, when the secondary base station is configured for the terminal, the carrier parameter used by the secondary base station is configured for the secondary base station, the autonomous rejection rule for the inter-modulation distortion occurred between the carrier used by the secondary base station and the carrier used by the primary base station is configured for the terminal and the carrier parameter and autonomous rejection rule configured by the primary base station are sent to the terminal. As such, the terminal may determine the carrier used by the secondary base station according to the carrier parameter configured by the primary base station and, when the inter-modulation distortion occurs between the carrier used by the secondary base station and the carrier used by the primary base station, determine the autonomously rejected carrier according to the autonomous rejection rule configured by the primary base station and perform data transmission with the other carrier except the determined autonomously rejected carrier. Therefore, important downlink signaling reception or important uplink signaling transmission of the terminal is ensured, and communication quality is improved.

In an embodiment, the autonomous rejection rule includes a specified number and a specified number of times. The specified number is configured for representing the number of consecutive subframes in a carrier, and the specified number of times is configured for representing the number of times that uplink subframe transmission is allowed to be autonomously rejected in the specified number of consecutive subframes.

It can be seen from the embodiment that the specified number and the specified number of times are configured for the terminal, the specified number being configured for representing the number of the consecutive subframes in a carrier and the specified number of times being configured for representing the number of times that uplink subframe transmission is allowed to be autonomously rejected in the specified number of consecutive subframes. The terminal may determine a carrier meeting the specified number and the specified number of times as the autonomously rejected carrier and perform data transmission with the other carrier except the autonomously rejected carrier, so that the inter-modulation distortion is avoided, and reliability of data transmission is improved.

In an embodiment, the autonomous rejection rule further includes a specified carrier, and the specified carrier is configured for representing a carrier allowed to be autonomously rejected in carriers configured for the secondary base station by the primary base station.

It can be seen from the embodiment that the specified carrier is configured for the terminal, and the specified carrier is configured for representing the carrier allowed to be autonomously rejected in the carriers configured for the secondary base station by the primary base station. Therefore, the terminal may directly determine the specified carrier as the autonomously rejected carrier and perform data transmission with the other carrier except the autonomously rejected carrier, so that efficiency in determining the autonomously rejected carrier by the terminal is improved, the inter-modulation distortion is also avoided, and the reliability of the data transmission is improved.

Figure 10:
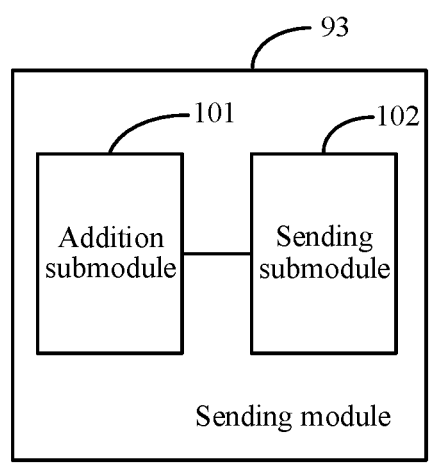
FIG. 10 is a block diagram of another data transmission device, according to an exemplary embodiment.

FIG. 10 is a block diagram of another data transmission device, according to an exemplary embodiment. The device is applied to a primary base station, and is established based on the device shown in FIG. 9. The sending module 93 may include an addition submodule 101 and a sending submodule 102.

The addition submodule 101 is configured to add the carrier parameter and the autonomous rejection rule into RRC connection configuration signaling.

The sending submodule 102 is configured to send the RRC connection configuration signaling containing the carrier parameter and the autonomous rejection rule to the terminal, to enable the terminal to acquire the carrier parameter and the autonomous rejection rule from the RRC connection configuration signaling.

It can be seen from the embodiment that the carrier parameter and autonomous rejection rule configured by the primary base station are added into the RRC connection configuration signaling and the RRC connection configuration signaling containing the carrier parameter and autonomous rejection rule configured by the primary base station is sent to the terminal. Therefore, the terminal may accurately and rapidly acquire the carrier parameter and autonomous rejection rule configured by the primary base station from the RRC connection configuration signaling, so that efficiency in acquiring configuration information of the primary base station by the terminal is improved.

Figure 11:
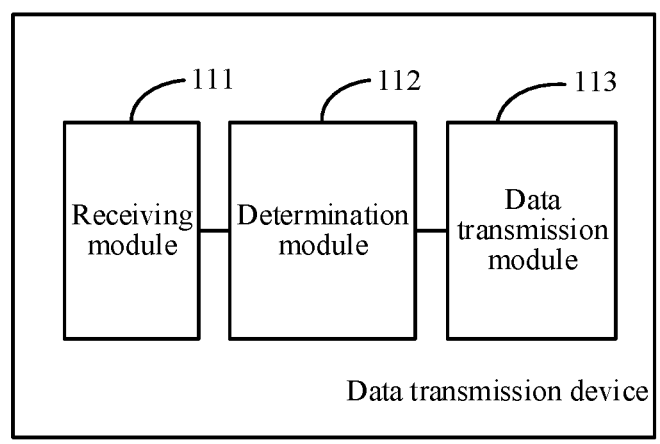
FIG. 11 is a block diagram of a data transmission device, according to an exemplary embodiment.

FIG. 11 is a block diagram of a data transmission device, according to an exemplary embodiment. The device is applied to a terminal, and is configured to execute the data transmission method shown in FIG. 4. As shown in FIG. 11, the data transmission device may include a receiving module 111, a determination module 112 and a data transmission module 113.

The receiving module 111 is configured to receive a carrier parameter and autonomous rejection rule sent by a primary base station. The carrier parameter is a carrier parameter configured for a secondary base station by the primary base station and used by the secondary base station, and the autonomous rejection rule is an autonomous rejection rule configured for the terminal by the primary base station for the terminal to address an inter-modulation distortion.

The determination module 112 is configured to determine a carrier used by the secondary base station according to the carrier parameter.

The data transmission module 113 is configured to, in response to the inter-modulation distortion occurring between the carrier used by the secondary base station and a carrier used by the primary base station, determine an autonomously rejected carrier according to the autonomous rejection rule and perform data transmission with another carrier except the autonomously rejected carrier.

In an embodiment, the primary base station is an LTE base station, and the secondary base station is an NR base station.

It can be seen from the embodiment that the carrier parameter and autonomous rejection rule sent by the primary base station are received, the carrier used by the secondary base station is determined according to the carrier parameter configured by the primary base station, and when the inter-modulation distortion occurs between the carrier used by the secondary base station and the carrier used by the primary base station, the autonomously rejected carrier is determined according to the autonomous rejection rule configured by the primary base station and data transmission is performed with the other carrier except the determined autonomously rejected carrier. Therefore, important downlink signaling reception or important uplink signaling transmission of the terminal is ensured, and communication quality is improved.

Figure 12:
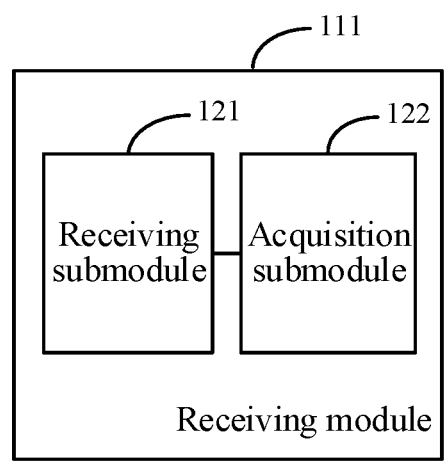
FIG. 12 is a block diagram of another data transmission device, according to an exemplary embodiment.

FIG. 12 is a block diagram of another data transmission device, according to an exemplary embodiment. The device is applied to a terminal, and is established based on the device shown in FIG. 11. As shown in FIG. 12, the data transmission device may include the following submodules. The receiving module 111 may include a receiving submodule 121 and an acquisition submodule 122.

The receiving submodule 121 is configured to receive RRC connection configuration signaling sent by the primary base station. The RRC connection configuration signaling contains the carrier parameter and the autonomous rejection rule.

The acquisition submodule 122 is configured to acquire the carrier parameter and the autonomous rejection rule from the RRC connection configuration signaling.

It can be seen from the embodiment that the RRC connection configuration signaling sent by the primary base station is received and the carrier parameter and autonomous rejection rule configured by the primary base station are acquired from the RRC connection configuration signaling, so that efficiency in acquiring configuration information of the primary base station by the terminal is improved.

Figure 13:
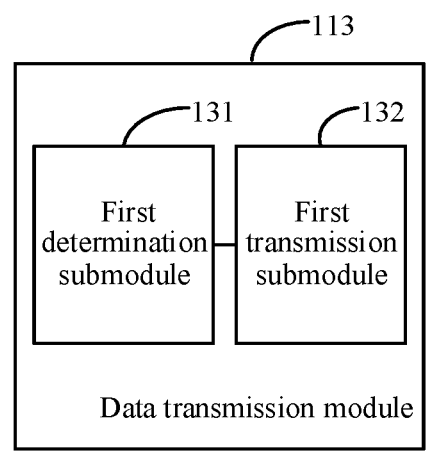
FIG. 13 is a block diagram of another data transmission device, according to an exemplary embodiment.

FIG. 13 is a block diagram of another data transmission device, according to an exemplary embodiment. The device is applied to a terminal, and is established based on the device shown in FIG. 11. The autonomous rejection rule includes a specified number and a specified number of times, the specified number is configured for representing the number of consecutive subframes in a carrier, and the specified number of times is configured for representing the number of times that uplink subframe transmission is allowed to be autonomously rejected in the specified number of consecutive subframes. As shown in FIG. 13, the data transmission module 113 may include a first determination submodule 131 and a first transmission submodule 132.

The first determination submodule 131 is configured to, in response to the inter-modulation distortion occurring between the carrier used by the secondary base station and the carrier used by the primary base station, determine, in the carrier used by the secondary base station and the carrier used by the primary base station, the carrier meeting the autonomous rejection rule as the autonomously rejected carrier.

The first transmission submodule 132 is configured to perform data transmission with the other carrier except the autonomously rejected carrier.

It can be seen from the embodiment that the carrier meeting the autonomous rejection rule configured by the primary base station is determined as the autonomously rejected carrier and data transmission is performed with the other carrier except the autonomously rejected carrier, so that the inter-modulation distortion is avoided, and reliability of data transmission is improved.

Figure 14:
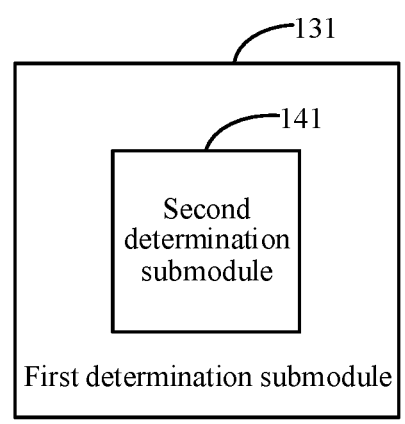
FIG. 14 is a block diagram of another data transmission device, according to an exemplary embodiment.

FIG. 14 is a block diagram of another data transmission device, according to an exemplary embodiment. The device is applied to a terminal, and is established based on the device shown in FIG. 13. As shown in FIG. 14, the first determination submodule 131 may include a second determination submodule 141.

The second determination submodule 141 is configured to, in response to both the carrier used by the secondary base station and the carrier used by the primary base station meeting the autonomous rejection rule, determine the autonomously rejected carrier according to a transmission carrier required by data to be transmitted, the autonomously rejected carrier being different from the transmission carrier required by the data to be transmitted.

It can be seen from the embodiment that the autonomously rejected carrier is determined according to the transmission carrier required by the data to be transmitted, and the autonomously rejected carrier is different from the transmission carrier required by the data to be transmitted, so that autonomous rejection manners for the terminal are enriched, and an applicability of data transmission is improved.

Figure 15:
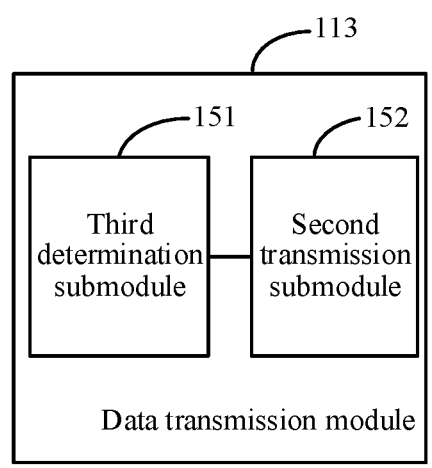
FIG. 15 is a block diagram of another data transmission device, according to an exemplary embodiment.

FIG. 15 is a block diagram of another data transmission device, according to an exemplary embodiment. The device is applied to a terminal, and is established based on the device shown in FIG. 13. The autonomous rejection rule further includes a specified carrier, and the specified carrier is configured for representing a carrier allowed to be autonomously rejected in carriers configured for the secondary base station by the primary base station. As shown in FIG. 15, the data transmission module 113 may include a third determination submodule 151 and a second transmission submodule 152.

The third determination submodule 151 is configured to determine the specified carrier as the autonomously rejected carrier.

The second transmission submodule 152 is configured to perform data transmission with the other carrier except the autonomously rejected carrier.

It can be seen from the embodiment that the specified carrier configured by the primary base station is directly determined as the autonomously rejected carrier and data transmission is performed with the other carrier except the autonomously rejected carrier, so that efficiency in determining the autonomously rejected carrier by the terminal is improved, the inter-modulation distortion is also avoided, and the reliability of the data transmission is improved.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

The present disclosure also provides a non-transitory computer-readable storage medium having stored therein a computer program for executing the data transmission method shown in any one of FIG. 1 to FIG. 3.

The present disclosure also provides a non-transitory computer-readable storage medium having stored therein a computer program for executing the data transmission method shown in any one of FIG. 4 to FIG. 8.

The present disclosure also provides a data transmission device, which is applied to a primary base station and includes:

a processor; and a memory device for storing instructions executable by the processor.

The processor is configured to perform the following operations.

In configuring a secondary base station for a terminal, a carrier parameter used by the secondary base station is configured for the secondary base station.

An autonomous rejection rule for an inter-modulation distortion occurred between a carrier used by the secondary base station and a carrier used by the primary base station is configured for the terminal.

The carrier parameter and the autonomous rejection rule are sent to the terminal.

Figure 16:
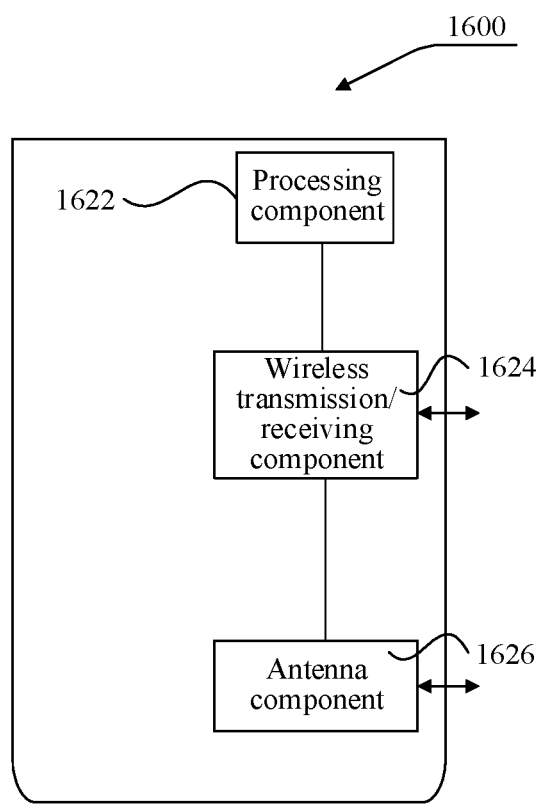
FIG. 16 is a structure diagram of a data transmission device, according to an exemplary embodiment.

As shown in FIG. 16, FIG. 16 is a structure diagram of a data transmission device, according to an exemplary embodiment. The device 1600 may be provided as a base station. Referring to FIG. 16, the device 1600 includes a processing component 1622, a wireless transmission/receiving component 1624, an antenna component 1626 and a wireless interface-specific signal processing part, and the processing component 1622 may further include one or more processors.

One processor in the processing component 1622 may be configured to execute any of the data transmission methods.

The present disclosure also provides a data transmission device, which is applied to a terminal and includes:

a processor; and a memory device for storing instructions executable by the processor.

The processor is configured to perform the following operations.

A carrier parameter and autonomous rejection rule sent by a primary base station are received. The carrier parameter is a carrier parameter configured for a secondary base station by the primary base station and used by the secondary base station, and the autonomous rejection rule is an autonomous rejection rule configured for the terminal by the primary base station for the terminal to address an inter-modulation distortion.

A carrier used by the secondary base station is determined according to the carrier parameter.

In response to an inter-modulation distortion occurring between the carrier used by the secondary base station and a carrier used by the primary base station, an autonomously rejected carrier is determined according to the autonomous rejection rule and data transmission is performed with another carrier except the autonomously rejected carrier.

Figure 17:
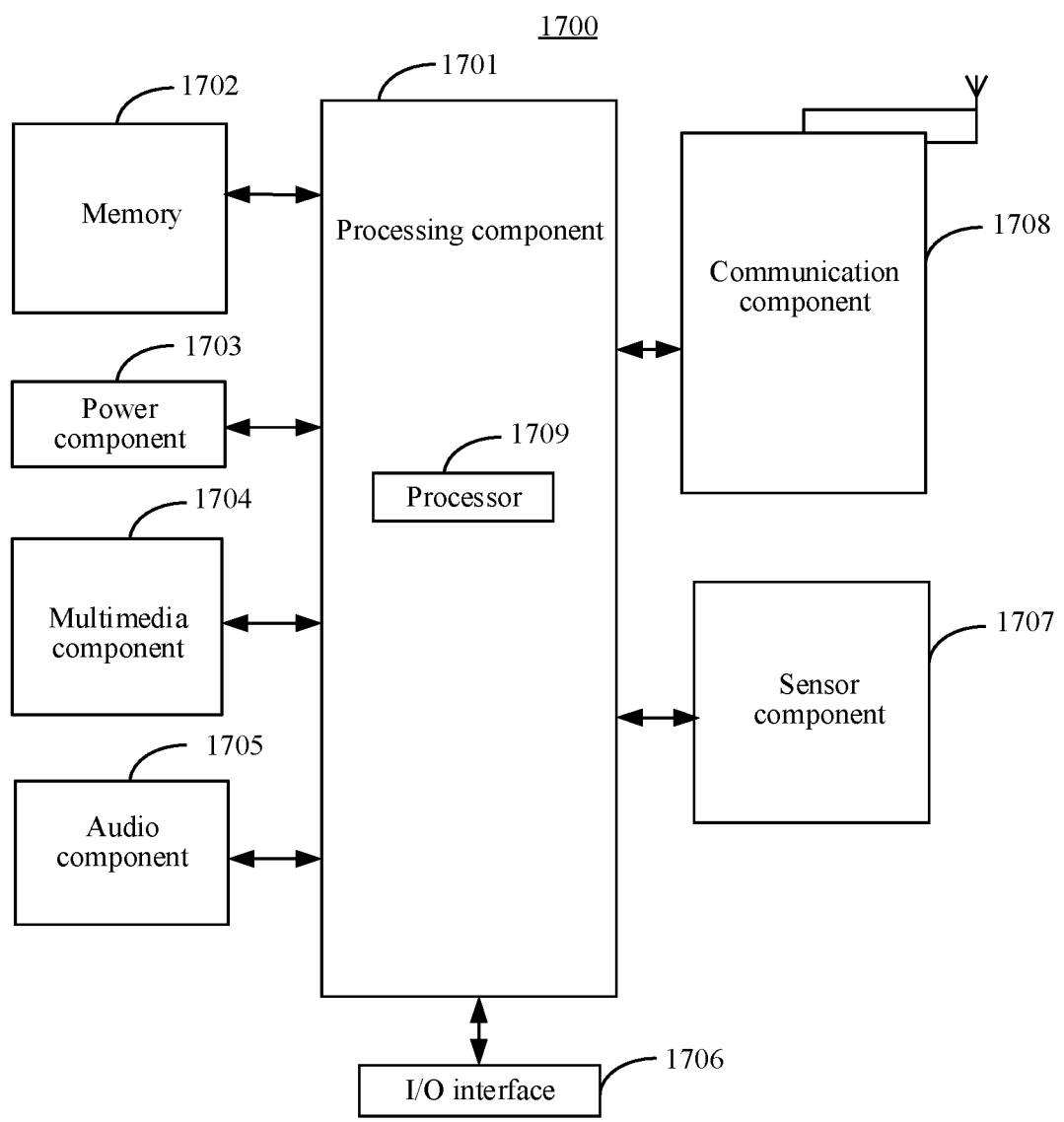
FIG. 17 is a structure diagram of a data transmission device, according to an exemplary embodiment.

FIG. 17 is a structure diagram of a data transmission device, according to an exemplary embodiment. FIG. 17 illustrates a data transmission device 1700 according to an exemplary embodiment. The device 1700 may be a terminal such as a computer, a mobile phone, a digital broadcast terminal, a messaging device, a gaming console, a tablet, a medical device, exercise equipment and a personal digital assistant.

Referring to FIG. 17, the device 1700 may include one or more of the following components: a processing component 1701, a memory device 1702, a power component 1703, a multimedia component 1704, an audio component 1705, an Input/Output (I/O) interface 1706, a sensor component 1707, and a communication component 1708.

The processing component 1701 typically controls overall operations of the device 1700, such as the operations associated with display, telephone calls, data communications, camera operations, and recording operations. The processing component 1701 may include one or more processors 1709 to execute instructions to perform all or part of the steps in the abovementioned method. Moreover, the processing component 1701 may include one or more modules which facilitate interaction between the processing component 1701 and the other components. For instance, the processing component 1701 may include a multimedia module to facilitate interaction between the multimedia component 1704 and the processing component 1701.

The memory 1702 is configured to store various types of data to support the operation of the device 1700. Examples of such data include instructions for any applications or methods operated on the device 1700, contact data, phonebook data, messages, pictures, video, etc. The memory 1702 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 1703 provides power for various components of the device 1700. The power component 1703 may include a power management system, one or more power supplies, and other components associated with generation, management and distribution of power for the device 1700.

The multimedia component 1704 includes a screen that provides an output interface between the device 1700 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1704 includes a front camera and/or a rear camera. The front camera and/or the rear camera may receive external multimedia data when the device 1700 is in an operation mode, such as a photographing mode or a video mode. Each of the front camera and the rear camera may be a fixed optical lens system or have focusing and optical zooming capabilities.

The audio component 1705 is configured to output and/or input an audio signal. For example, the audio component 1705 includes a Microphone (MIC), and the MIC is configured to receive an external audio signal when the device 1700 is in the operation mode, such as a call mode, a recording mode and a voice recognition mode. The received audio signal may further be stored in the memory 1702 or sent through the communication component 1708. In some embodiments, the audio component 1705 further includes a speaker configured to output the audio signal.

The I/O interface 1706 provides an interface between the processing component 1701 and a peripheral interface module, and the peripheral interface module may be a keyboard, a click wheel, a button and the like. The button may include, but not limited to: a home button, a volume button, a starting button and a locking button.

The sensor component 1707 includes one or more sensors configured to provide status assessment in various aspects for the device 1700. For instance, the sensor component 1707 may detect an on/off status of the device 1700 and relative positioning of components, such as a display and small keyboard of the device 1700. The sensor component 1707 may further detect a change in a position of the device 1700 or a component of the device 1700, presence or absence of contact between the user and the device 1700, orientation or acceleration/deceleration of the device 1700 and a change in temperature of the device 1700. The sensor component 1707 may include a proximity sensor capable of detecting presence of nearby objects without any physical contact. The sensor component 1707 may also include a light sensor, such as a Complementary Metal Oxide Semiconductor (CMOS) or Charge Coupled Device (CCD) image sensor, configured for use in an imaging application. In some embodiments, the sensor component 1707 may also include an acceleration sensor, a gyroscope sensor, a magnetic sensor, a pressure sensor or a temperature sensor.

The communication component 1708 is configured to facilitate wired or wireless communication between the device 1700 and another device. The device 1700 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 1708 receives a broadcast signal or broadcast associated information from an external broadcast management system through a broadcast channel. In an exemplary embodiment, the communication component 1708 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 1702 including instructions, and the instructions may be executed by the processor 1709 of the device 1700 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

The instructions in the storage medium are executed by the processor to enable the device 1700 to execute any of the above data transmission methods.

It will be appreciated that the present disclosure is not limited to the exact construction that has been described above and illustrated in the accompanying drawings, and that various modifications and changes may be made without departing from the scope of the present disclosure. It is intended that the scope of the present disclosure only be limited by the appended claims.

The invention claimed is:

1. A data transmission method, applied to a primary base station and comprising:
   configuring a carrier parameter used by a secondary base station for the secondary base station;
   configuring an autonomous rejection rule for a terminal when an inter-modulation distortion in downlink reception caused by simultaneous uplink transmissions on a carrier used by the secondary base station and a carrier used by the primary base station occurs; and
   sending the carrier parameter and information associated with the autonomous rejection rule to the terminal, wherein
      the autonomous rejection rule comprises a specified number and a specified number of times,
      the specified number is configured for representing the number of consecutive subframes in a carrier, and
      the specified number of times is configured for representing the number of times that uplink subframe transmission is allowed to be autonomously rejected in the specified number of consecutive subframes.

2. The method of claim 1, wherein the primary base station is a Long Term Evolution (LTE) base station, and the secondary base station is a New Radio (NR) base station.

3. The method of claim 1, wherein the autonomous rejection rule further comprises a specified carrier, and
   the specified carrier is configured for representing a carrier allowed to be autonomously rejected in carriers configured for the secondary base station by the primary base station.

4. The method of claim 1, wherein sending the carrier parameter and the information associated with the autonomous rejection rule to the terminal comprises:
   adding the carrier parameter and the information associated with the autonomous rejection rule into Radio Resource Control (RRC) connection reconfiguration signaling; and
   sending the RRC connection reconfiguration signaling containing the carrier parameter and the information associated with the autonomous rejection rule to the terminal, to enable the terminal to acquire the carrier parameter and the information associated with the autonomous rejection rule from the RRC connection reconfiguration signaling.

5. A data transmission method, applied to a terminal and comprising:
   receiving a carrier parameter and information associated with an autonomous rejection rule sent by a primary base station, the carrier parameter being a carrier parameter configured for a secondary base station by the primary base station and used by the secondary base station, and the autonomous rejection rule being an autonomous rejection rule configured for the terminal by the primary base station for the terminal to address an inter-modulation distortion;
   determining a carrier used by the secondary base station according to the carrier parameter; and
   in response to an inter-modulation distortion in downlink reception caused by simultaneous uplink transmissions on the carrier used by the secondary base station and a carrier used by the primary base station occurring, determining an autonomously rejected carrier according to the autonomous rejection rule, and performing data transmission with another carrier except the autonomously rejected carrier, wherein the autonomous rejection rule comprises a specified number and a specified number of times,
the specified number is configured for representing the number of consecutive subframes in a carrier, and
the specified number of times is configured for representing the number of times that uplink subframe transmission is allowed to be autonomously rejected in the specified number of consecutive subframes.

6. The method of claim 5, wherein the primary base station is a Long Term Evolution (LTE) base station, and the secondary base station is a New Radio (NR) base station.

7. The method of claim 5, wherein receiving the carrier parameter and the information associated with the autonomous rejection rule sent by the primary base station comprises:
receiving Radio Resource Control (RRC) connection reconfiguration signaling sent by the primary base station, the RRC connection reconfiguration signaling containing the carrier parameter and the information associated with the autonomous rejection rule; and
acquiring the carrier parameter and the information associated with the autonomous rejection rule from the RRC connection reconfiguration signaling.

8. The method of claim 5,
wherein determining the autonomously rejected carrier according to the autonomous rejection rule comprises:
determining, in the carrier used by the secondary base station and the carrier used by the primary base station, the carrier meeting the autonomous rejection rule as the autonomously rejected carrier.

9. The method of claim 8, wherein the determining, in the carrier used by the secondary base station and the carrier used by the primary base station, the carrier meeting the autonomous rejection rule as the autonomously rejected carrier comprises:
in response to both the carrier used by the secondary base station and the carrier used by the primary base station meeting the autonomous rejection rule, determining the autonomously rejected carrier according to a transmission carrier required by data to be transmitted, the autonomously rejected carrier being different from the transmission carrier required by the data to be transmitted.

10. The method of claim 5, wherein the autonomous rejection rule further comprises a specified carrier, and the specified carrier is configured for representing a carrier allowed to be autonomously rejected in carriers configured for the secondary base station by the primary base station; and
determining the autonomously rejected carrier according to the autonomous rejection rule comprises:
determining the specified carrier as the autonomously rejected carrier.

11. A data transmission device, applied to a terminal and comprising:
a processor; and
memory storing a set of instructions executable by the processor,
wherein the processor is configured to:
receive a carrier parameter and information associated with an autonomous rejection rule sent by a primary base station, the carrier parameter being a carrier parameter configured for a secondary base station by the primary base station and used by the secondary base station, and the autonomous rejection rule being an autonomous rejection rule configured for the terminal by the primary base station for the terminal to address an inter-modulation distortion;
determine a carrier used by the secondary base station according to the carrier parameter; and
in response to an inter-modulation distortion in downlink reception caused by simultaneous uplink transmissions on the carrier used by the secondary base station and a carrier used by the primary base station occurring, determine an autonomously rejected carrier according to the autonomous rejection rule and perform data transmission with another carrier except the autonomously rejected carrier, wherein
the autonomous rejection rule comprises a specified number and a specified number of times,
the specified number is configured for representing the number of consecutive subframes in a carrier, and
the specified number of times is configured for representing the number of times that uplink subframe transmission is allowed to be autonomously rejected in the specified number of consecutive subframes.

12. The device of claim 11, wherein the primary base station is a Long Term Evolution (LTE) base station, and the secondary base station is a New Radio (NR) base station.

13. The device of claim 11, wherein the processor is further configured to:
receive Radio Resource Control (RRC) connection reconfiguration signaling sent by the primary base station, the RRC connection reconfiguration signaling containing the carrier parameter and the information associated with the autonomous rejection rule; and
acquire the carrier parameter and the information associated with the autonomous rejection rule from the RRC connection reconfiguration signaling.

14. The device of claim 11,
wherein the processor is further configured to:
in response to the inter-modulation distortion occurring, determine, in the carrier used by the secondary base station and the carrier used by the primary base station, the carrier meeting the autonomous rejection rule as the autonomously rejected carrier, and
perform data transmission with the other carrier except the autonomously rejected carrier.

15. The device of claim 14, wherein the processor is further configured to:
in response to both the carrier used by the secondary base station and the carrier used by the primary base station meeting the autonomous rejection rule, determine the autonomously rejected carrier according to a transmission carrier required by data to be transmitted, the autonomously rejected carrier being different from the transmission carrier required by the data to be transmitted.

16. The device of claim 11, wherein the autonomous rejection rule further comprises a specified carrier, and the specified carrier is configured for representing a carrier allowed to be autonomously rejected in carriers configured for the secondary base station by the primary base station; and
wherein the processor is further configured to:
determine the specified carrier as the autonomously rejected carrier, and
perform data transmission with the other carrier except the autonomously rejected carrier.

17. A data transmission device implementing the method of claim 1, applied to a primary base station and comprising:
a processor; and
memory storing instructions executable by the processor, wherein the processor is configured to perform operations of the method.

18. A communication system comprising a primary base station configured to implementing the method of claim 1, the communication system further comprises a terminal configured to:
- determine the carrier used by the secondary base station according to the carrier parameter configured by the primary base station; and
- in response to the inter-modulation distortion occurring, determine the autonomously rejected carrier according to the autonomous rejection rule configured by the primary base station and perform data transmission with the other carrier except the determined autonomously rejected carrier, to thereby ensure important downlink signaling reception or important uplink signaling transmission of the terminal, and improve communication quality.

19. The communication system of claim 18, further comprising the secondary base station, wherein the primary base station is a Long Term Evolution (LTE) base station, and the secondary base station is a New Radio (NR) base station.

\* \* \* \* \*